US008831001B2

(12) United States Patent
Klimker (10) Patent No.: US 8,831,001 B2
(45) Date of Patent: Sep. 9, 2014

(54) DEVICE, SYSTEM, AND METHOD OF VOICE-OVER-IP COMMUNICATION

(75) Inventor: Oren Klimker, Shoham (IL)

(73) Assignee: AudioCodes Ltd., Lod (IL)

( * ) Notice: Subject to any disclaimer, the term of this patent is extended or adjusted under 35 U.S.C. 154(b) by 62 days.

(21) Appl. No.: 13/531,542

(22) Filed: Jun. 24, 2012

(65) Prior Publication Data

US 2013/0343381 A1    Dec. 26, 2013

(51) Int. Cl.
*H04L 12/28* (2006.01)
*H04L 12/54* (2013.01)

(52) U.S. Cl.
CPC ................................ *H04L 12/569* (2013.01)
USPC .................... 370/392; 370/394; 370/395.1

(58) Field of Classification Search
None
See application file for complete search history.

(56) References Cited

U.S. PATENT DOCUMENTS

| | | | |
|---|---|---|---|
| 7,246,057 B1 * | 7/2007 | Sundqvist et al. | 704/219 |
| 7,313,593 B1 * | 12/2007 | Pulito et al. | 709/204 |
| 2007/0086481 A1 * | 4/2007 | Klemets | 370/466 |
| 2007/0124813 A1 * | 5/2007 | Ormazabal et al. | 726/11 |
| 2007/0127466 A1 * | 6/2007 | Seon | 370/389 |
| 2007/0260870 A1 * | 11/2007 | Nissan et al. | 713/150 |
| 2009/0135724 A1 * | 5/2009 | Zhang et al. | 370/241 |
| 2009/0185673 A1 * | 7/2009 | Erhart et al. | 379/265.09 |

OTHER PUBLICATIONS

International Telecommunication Union (ITU), Telecommunication Standardization Sector of ITU (ITU-T), Series G: Transmission Systems and Media, Digital Systems and Networks, Recommendation G.799.3: Signal processing functionality and performance of an IP-to-IP voice gateway optimized for the transport of voice and voiceband data, dated May 2011.

* cited by examiner

*Primary Examiner* — Kwang B Yao
*Assistant Examiner* — Hardikkumar Patel
(74) *Attorney, Agent, or Firm* — Eitan, Mehulal & Sadot (57) ABSTRACT

The present invention includes devices, systems, and methods of Voice-over-Internet Protocol (VoIP) communication. For example, a method includes: receiving a data stream comprising a set of VoIP packets; and modifying a Real Time Protocol (RTP) header of at least one of said VoIP packets to modify a jitter buffer delay of said data stream. Optionally, the method includes decreasing the jitter buffer delay by: dropping at least one packet from said data stream; and decreasing a sequence number and a timestamp value in an RTP header of at least one additional packet subsequent to said at least one packet. Optionally, the method includes increasing the jitter buffer delay by: identifying a pair of consecutive packets in the incoming data stream, the pair of consecutive packets having consecutive sequence numbers; and increasing a sequence number in an RTP header of at least a latter packet in said pair of consecutive packets.

16 Claims, 5 Drawing Sheets

DEVICE, SYSTEM, AND METHOD OF VOICE-OVER-IP COMMUNICATION

FIELD OF THE INVENTION

The present invention relates to the field of Voice over Internet Protocol (VoIP) communication.

BACKGROUND

A VoIP network may include various VoIP components, for example, wired Internet Protocol (IP) phones, wireless IP phones, and one or more gateways. Optionally, a Session Border Controller (SBC) may mediate between an internal VoIP network (e.g., operable within an organization or enterprise) and an external VoIP network, or vice versa, or between other two networks.

Some VoIP networks may suffer from jitter, e.g., variance in the delay at which VoIP packets arrive at a VoIP component. Some VoIP components in an internal VoIP network may be able to partially handle jitter, up to a certain threshold typically dictated by a size of a local jitter buffer.

In some VoIP systems, jitter originating from an external VoIP or wireless network may be large and may not be properly handled or corrected by a local VoIP component. This may degrade quality of voice calls incoming from such external VoIP network.

SUMMARY

The present invention may include, for example, a device, a system, and a method of VoIP communication. For example, the present invention may adjust, modify, increase and/or decrease a jitter buffer delay, by selectively modifying Real Time Protocol (RTP) headers of VoIP packets in a data stream, and/or by dropping or removing VoIP packets from the data stream.

In accordance with the present invention, for example, a method of Voice over Internet Protocol (VoIP) communication may include: receiving a data stream comprising a set of VoIP packets; and modifying a Real Time Protocol (RTP) header of at least one of said VoIP packets to modify a jitter buffer delay of said data stream.

In accordance with the present invention, for example, the method may include decreasing the jitter buffer delay by: dropping at least one packet from said data stream; and decreasing a sequence number and a timestamp value in an RTP header of at least one additional packet subsequent to said at least one packet.

In accordance with the present invention, for example, the method may include decreasing a sequence number and a timestamp value in RTP headers of all packets subsequent to said at least one packet.

In accordance with the present invention, for example, the method may include increasing the jitter buffer delay by: identifying a pair of consecutive packets in the incoming data stream, the pair of consecutive packets having consecutive sequence numbers; and increasing a sequence number in an RTP header of at least a latter packet in said pair of consecutive packets.

In accordance with the present invention, for example, the method may include increasing a sequence number in RTP headers of all packets in said data stream starting at said latter packet and onward.

In accordance with the present invention, for example, increasing the sequence number may include: increasing the sequence number by a natural number computed by taking into account a target increase in the jitter buffer delay.

In accordance with the present invention, for example, the method may include modifying the RTP header without decoding a payload of any VoIP packet of said data stream.

In accordance with the present invention, for example, the method may include modifying the RTP header without re-encoding a payload of any VoIP packet of said data stream.

In accordance with the present invention, for example, the method may include detecting a portion of the data stream which corresponds to a silence period; and modifying the RTP headers of one or more VoIP packets of that portion of the data stream more frequently relative to other one or more portions of said data stream.

In accordance with the present invention, for example, an apparatus of Voice over Internet Protocol (VoIP) communication may include: a jitter buffer to receive a data stream comprising a set of VoIP packets; and a Real Time Protocol (RTP) header modifier to modify an RTP header of at least one of said VoIP packets to modify a jitter buffer delay of said data stream.

In accordance with the present invention, for example, the RTP header modifier is to decrease the jitter buffer delay; wherein the apparatus comprises a jitter buffer correction logic to drop at least one packet from said data stream; and the RTP header modifier is to decrease a sequence number and a timestamp value in an RTP header of at least one additional packet subsequent to said at least one packet.

In accordance with the present invention, for example, the RTP header modifier is to decrease a sequence number and a timestamp value in RTP headers of all packets subsequent to said at least one packet.

In accordance with the present invention, for example, the RTP header modifier is to increase the jitter buffer delay; the apparatus comprises a jitter buffer correction logic to identify a pair of consecutive packets in the incoming data stream, the pair of consecutive packets having consecutive sequence numbers; and the RTP header modifier is to increase a sequence number in an RTP header of at least a latter packet in said pair of consecutive packets.

In accordance with the present invention, for example, the RTP header modifier is to increase a sequence number in RTP headers of all packets in said data stream starting at said latter packet and onward.

In accordance with the present invention, for example, the RTP header modifier is to increase the sequence number by a natural number computed by taking into account a target increase in the jitter buffer delay.

In accordance with the present invention, for example, the RTP header modifier is to modify the RTP header without decoding a payload of any VoIP packet of said data stream.

In accordance with the present invention, for example, the RTP header modifier is to modify the RTP header without re-encoding a payload of any VoIP packet of said data stream.

In accordance with the present invention, for example, the apparatus may include a jitter buffer correction logic to detect a portion of the data stream which corresponds to a silence period; and the RTP header modifier is to modify the RTP headers of one or more VoIP packets of that portion of the data stream more frequently relative to other one or more portions of said data stream.

In accordance with the present invention, for example, the jitter buffer is to receive a first data stream portion and a second, subsequent, data stream portion; for the first data stream portion, the RTP header modifier is to decrease the jitter buffer delay; and for the second data stream portion, the RTP header modifier is to increase the jitter buffer delay.

In accordance with the present invention, for example, the apparatus may be or may include a session border controller.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that a conventional Session Border Controller (SBC) may unnecessarily perform a process of decoding the payload data of VoIP packets, performing jitter correction using a jitter buffer (which may optionally have a dynamically-adjustable size), re-encoding the payload data of the VoIP packets, and then packing the re-encoded VoIP packets with a Real Time Protocol (RTP) header. This process may degrade the quality of voice carried by the VoIP packets, and may also consume unnecessary processing resources.

Applicants have further realized that utilization of a jitter buffer having a dynamically-adjustable size (e.g., based on an estimation of the delay in arrival of packets) may not suffice to adequately mitigate jitter buffer in VoIP networks. For example, an adjustable-size jitter buffer may need to increase the delay by adding packets or samples, or may need to reduce the delay by dropping packets or samples. However, in VoIP systems that utilize a low bitrate voice CODEC, adding or dropping packets or samples may degrade voice quality, particularly if decoding and re-encoding is not utilized and/or if packet loss concealment is not utilized or cannot be utilized.

The present invention may include, for example, adaptive jitter buffering which may obviate the need to decode and re-encode VoIP packets. Compressed data of a VoIP media stream may be transferred from an external VoIP network to a VoIP component without decoding and/or re-encoding of payload data. Jitter may be eliminated or reduced by deleting an RTP packet and/or by manipulating (or modifying) RTP header(s) of VoIP packet(s).

Figure 1:
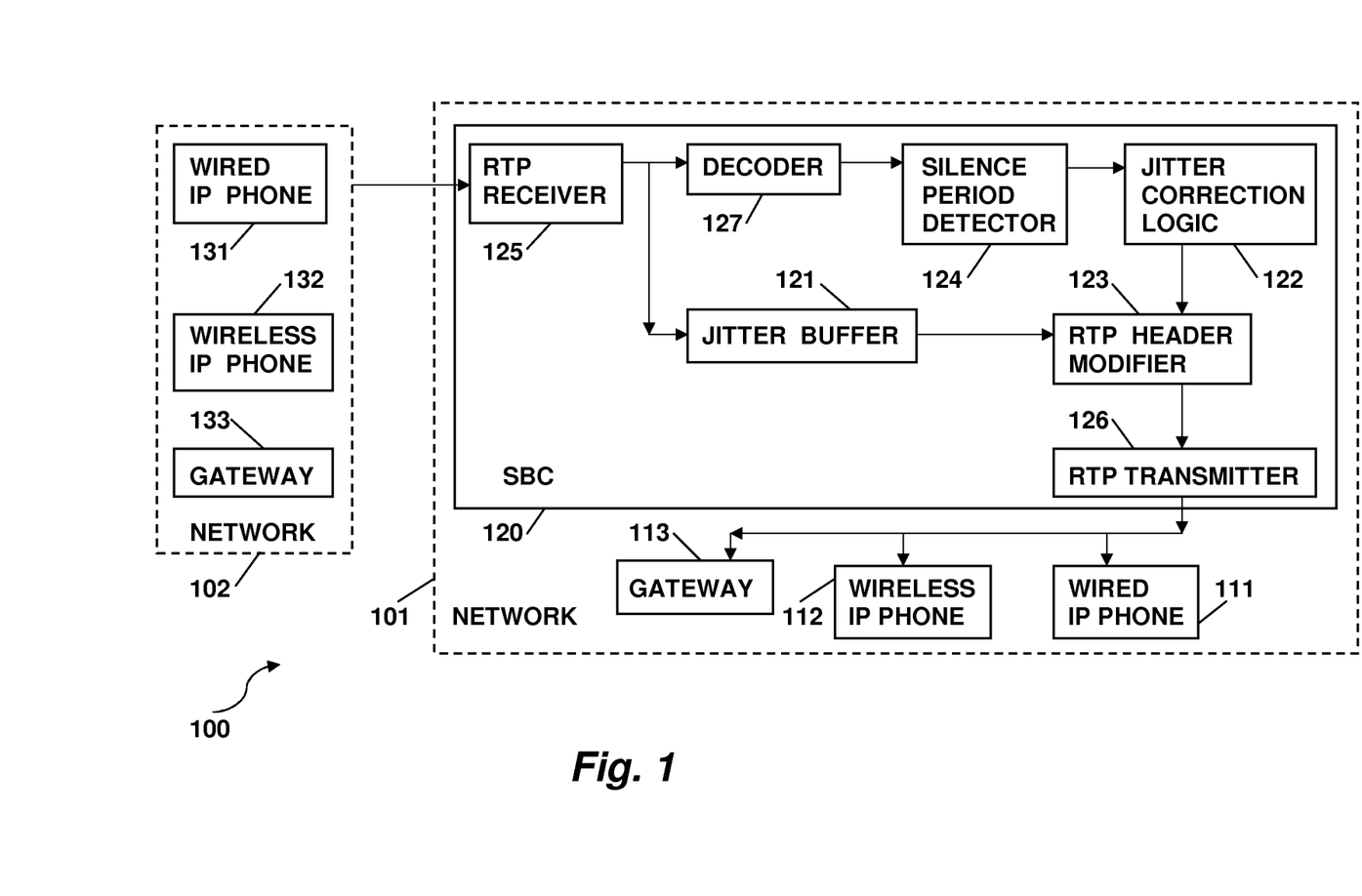
FIG. 1 is a schematic block diagram illustration of a communication system in accordance with the present invention.

Reference is made to FIG. 1, which is a schematic block diagram illustration of a communication system 100 in accordance with the present invention. System 100 may include one or more VoIP networks, for example, networks 101 and 102. In a demonstrative implementation, network 101 may be a low-jitter VoIP network which may operate, for example, internally within an organization or enterprise; whereas network 102 may be a high-jitter VoIP network which may be, for example, external to such organization or enterprise, or may be a wireless network or a Wide Area Network (WAN).

Network 101 may include one or more VoIP clients, for example, one or more wired IP phones 111 and/or one or more wireless IP phones 112. Similarly, network 102 may include one or more VoIP clients, for example, one or more wired IP phones 131 and/or one or more wireless IP phones 132. Network 101 and/or network 102 may optionally include other or additional components; for example, an optional gateway 113 is shown as part of network 101, and an optional gateway 133 is shown as part of network 102.

System 100 may include a session border controller (SBC) 120, which is shown for demonstrative purposes as part of network 101. It is noted that SBC 120 may be implemented, for example, as part of network 101, as part of network 102, or as a separate mediating component which may be connected between network 101 and network 102. Optionally, one or more of the functionalities that are discussed herein with reference to SBC 120, may be performed by other component(s) or communication mediating units.

SBC 120 may include, for example, an RTP receiver 125 to receive an incoming RTP stream or incoming RTP packets; a jitter buffer 121; a jitter correction logic unit 122; an RTP header modifier 123 and an RTP transmitter 126 to generate the output of modified RTP packets. SBC 120 may optionally include a silence period detector 124, which may optionally utilize a decoder 127 for detecting silence period(s).

Jitter buffer 121 may be or may include, for example, a jitter buffer having a fixed size, or a jitter buffer having a dynamically-adjusted size. Jitter buffer 121 may be operating at a state in which the jitter buffer delay is excessive and should be decreased; or conversely, at a state in which the jitter buffer delay is insufficient and should be increased. Such increase or decrease in the jitter buffer delay may be determined and/or performed by jitter correction logic unit 122 and/or by RTP header modifier 123, as described herein.

Jitter correction logic unit 122 may include circuitry, logic or module(s) to determine whether or not jitter associated with an incoming data stream requires RTP header modification by RTP header modifier 123. For example, if jitter correction logic unit 122 determines that the jitter is at a level which may not be appropriately handled by jitter buffer 121 (e.g., due to a limited size of jitter buffer 121), then one or more VoIP packets of the data stream may be subject to RTP header modification by RTP header modifier 123. Alternatively, if jitter correction logic unit 122 determines that the jitter is at a level which may be handled by jitter buffer 121, then one or more VoIP packets may bypass RTP header modifier 123, or may not be subject to RTP header modification or manipulation.

If jitter buffer 121 decreases the delay between VoIP packets, then jitter correction logic unit 122 may determine to drop an RTP packet; and RTP header modifier 123 may update the RTP headers of subsequent VoIP packets. For example, RTP sequence number and RTP timestamp of subsequent RTP headers may be updated to be sequential, such that RTP packet loss may not be noticed by a remote VoIP component.

Conversely, if jitter buffer 121 increases the delay between VoIP packets, then jitter correction logic unit 122 may determine that RTP header modifier 123 is to modify the RTP header of the following VoIP packet by incrementing the sequence number and timestamp of that VoIP packet (or of a set of packets that follow, or of substantially all the packets that follow in that data stream). This may cause the remote VoIP component to recognize a packet loss, and may cause it to generate one or more additional VoIP packet(s). For example, the remote VoIP component may utilize a suitable packet loss concealment method.

In accordance with the present invention, it may be preferred or advantageous to perform RTP header modification for purposes of jitter buffer delay adjustment, particularly and/or selectively during silence period(s), or with regard to portions of the data stream that correspond to silence (rather than to voice or speech or audible utterances). For example, silence period may be more suitable for dropping packet(s), and/or for modifying sequence number and/or timestamp of packet header(s), without affecting or degrading call quality or voice quality, and without dropping speech utterances. Accordingly, RTP header modification may optionally be performed particularly during silence periods or non-voice-activity periods, or may be performed more frequently during silence periods or non-voice-activity periods. For this purpose, silence period detector 124 may be optionally included in SBC 120 or in jitter correction logic unit 122, and may detect a silence period, for example, based on payload data decoded by optional decoder 127 (but without re-encoding or transcoding payload data) or based on other indicators of silence. It would be appreciated that although some conventional systems may detect silence periods in order to possibly perform other types of maintenance or voice-improvement processes, the present invention may be used in order to particularly and selectively modify RTP headers (and/or drop VoIP packets) preferably during a detected silence period, rather than during a speech period or voice period.

A faster rate of RTP packet addition/deletion or header modification may be used if system 100 utilizes a voice coder capable of better handling packet loss. Accordingly, jitter buffer delay adjustment rate may be adapted or modified in real time to suit the voice coder or CODEC being used. For example, the rate of RTP packet addition/deletion or header modification may be hard-coded or pre-defined, may be programmable, or may be otherwise modifiable or adjustable, e.g., by jitter correction logic unit 122.

Although portions of the discussion herein may relate, for demonstrative purposes, to dropping or removal of a single VoIP packet, the present invention may include dropping or removal of multiple VoIP packets, which may be consecutive and/or non-consecutive, in order to adjust the jitter buffer delay.

Although portions of the discussion herein may relate, for demonstrative purposes, to modifying the sequence number of an RTP header of a single VoIP packet, the present invention may include modifying the sequence number of RTP headers of multiple VoIP packets, which may be consecutive and/or non-consecutive (or may include substantially all the VoIP packets of a data stream, or may include substantially all the VoIP packets following a particular setoff in the data stream), in order to adjust the jitter buffer delay.

Figure 2A:
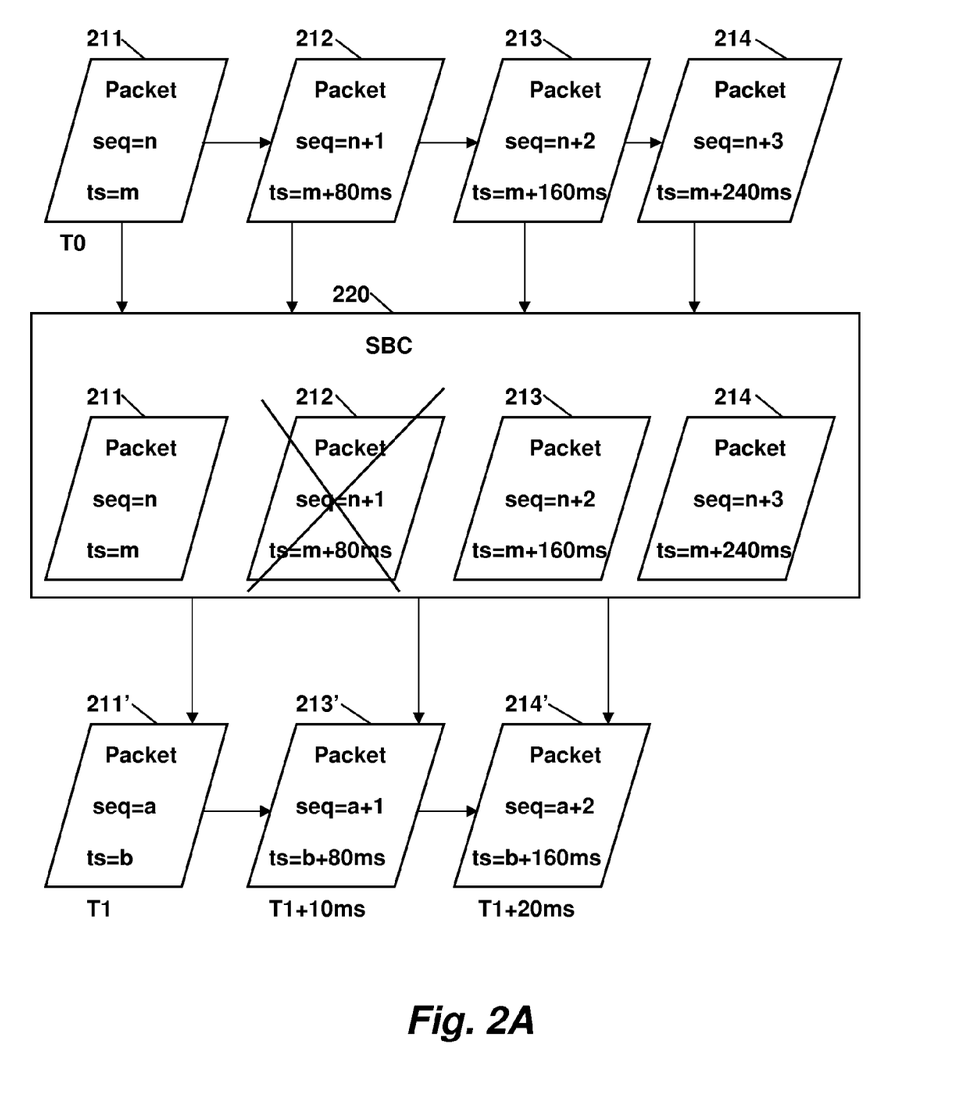
FIG. 2A is an illustration demonstrating the operation of an SBC which decreases the jitter buffer delay, in accordance with the present invention.

Reference is made to FIG. 2A, which is an illustration demonstrating an SBC 220 which decreases the jitter buffer delay associated with an incoming data stream by utilizing packet dropping and RTP header modification, in accordance with the present invention. SBC 220 of FIG. 2A may be generally similar to SBC 120 of FIG. 1.

A top portion of FIG. 2A shows an incoming data stream having four VoIP packets 211-214. An RTP header of packet 211 may have a sequence number of n, wherein n may be a positive number or zero; an RTP header of packet 212 may have a sequence number of n+1; an RTP header of packet 213 may have a sequence number of n+2; and an RTP header of packet 214 may have a sequence number of n+3. Furthermore, the RTP header of packet 211 may have a timestamp of m (e.g., measured in milliseconds); the RTP header of packet 212 may have a timestamp of m+80 milliseconds; the RTP header of packet 213 may have a timestamp of m+160 milliseconds; and the RTP header of packet 214 may have a timestamp of m+240 milliseconds.

In the demonstrative example shown, the incoming packets 211-214 packets arrive to SBC 220 at time point T0 (namely, the first VoIP packet 211 arrives to SBC 220 at time point T0), and the output generated by SBC 220 exits SBC 220 starting at a later time point T1. The difference $\Delta = T1 - T0$ may be the jitter buffer delay, which may be adjusted or modified (e.g., reduced, in the example shown in FIG. 2A) in accordance with the present invention.

A central portion of FIG. 2A shows the data stream as handled within SBC 220, such that one of the VoIP packets (packet 212) is dropped or removed from the data stream by SBC 220. Furthermore, SBC 220 modifies the RTP headers of the remaining packets, to generate an output data stream which is shown in the bottom portion of FIG. 2A. Whereas the input data stream included four VoIP packets (211-214), the output data stream includes only three VoIP packets (denoted 211', 213' and 214'). Moreover, the RTP headers of the three VoIP packets 211', 213' and 214' was modified by SBC 220 as follows: their sequence numbers may be, for example, a, a+1, and a+2 (respectively), and their timestamp values may be, for example, b, b+80, and b+160 (respectively). It is noted that SBC 220 may output the modified data stream including the three VoIP packets 211', 213' and 214' at particular points in time, for example, at time points T1, T1+10 milliseconds, and T1+20 milliseconds (respectively).

As demonstrated, the four incoming VoIP packets 211-214, which spanned 240 milliseconds and occupied four consecutive sequence numbers, have been modified. SBC 220 dropped one VoIP packet (212), and modified the RTP headers of the three other VoIP packets (211, 213, 214) thereby generating a shorter data stream having only three VoIP packets (211', 213', 214'), which span only 160 milliseconds (instead of 240 milliseconds) and occupy only three consecutive sequence numbers (instead of four consecutive sequence numbers). Accordingly, the jitter buffer delay is decreased.

Optionally, a VoIP packet may be maintained by SBC 220 in a substantially unmodified form. A VoIP packet which is referred to herein as being "maintained", may optionally include a VoIP packet having an RTP header that has been modified or manipulated in accordance with the present invention. For example, even an RTP header of such a "maintained" VoIP packet (e.g., a first VoIP packet in a data stream) may optionally be modified to reflect an updated or modified offset within the data stream. In accordance with the present invention, "maintaining" of a VoIP packet may include, for example, maintaining the timestamp difference between that VoIP packet and its immediately-preceding VoIP packet, and/or maintaining the sequence number difference between that VoIP packet and its immediately-preceding VoIP packet.

For demonstrative purposes, FIG. 2A shows the output RTP stream frame duration as 10 milliseconds; such that each RTP packets carries data corresponding to 10 milliseconds. Other suitable values of RTP frame duration may be used.

Figure 2B:
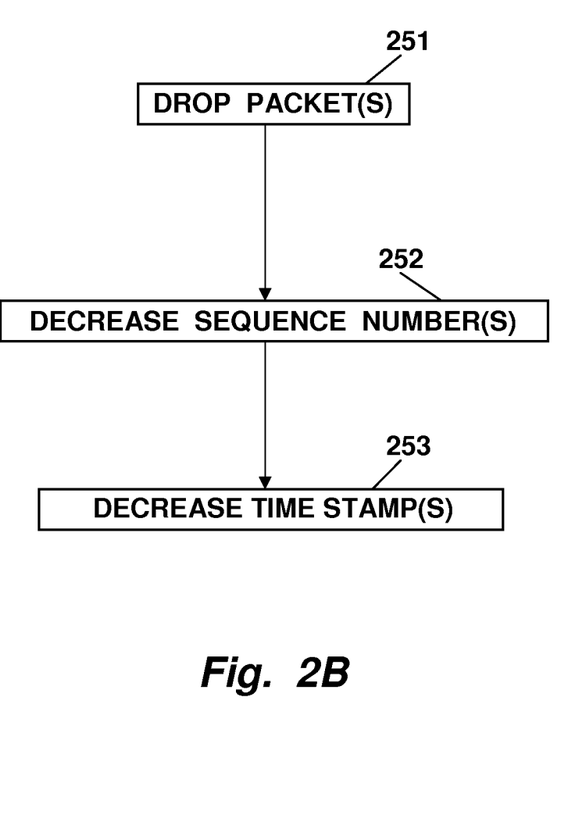
FIG. 2B is a schematic flowchart of a method of decreasing jitter buffer delay, in accordance with the present invention.

Reference is made to FIG. 2B, which is a schematic flowchart of a method of decreasing jitter buffer delay, in accordance with the present invention. The method may be implemented, for example, by system 100 of FIG. 1, by SBC 120 of FIG. 1, by SBC 220 of FIG. 2A, or by other suitable systems or devices.

The method may optionally include, for example, dropping one or more VoIP packets (block 251); decreasing a sequence number in an RTP header of one or more VoIP packets subsequent to the dropped packet (block 252); and decreasing a timestamp in an RTP header of each one of one or more VoIP packets that are subsequent to the dropped packet (block 253). Other suitable operations may be used in accordance with the present invention.

Figure 3A:
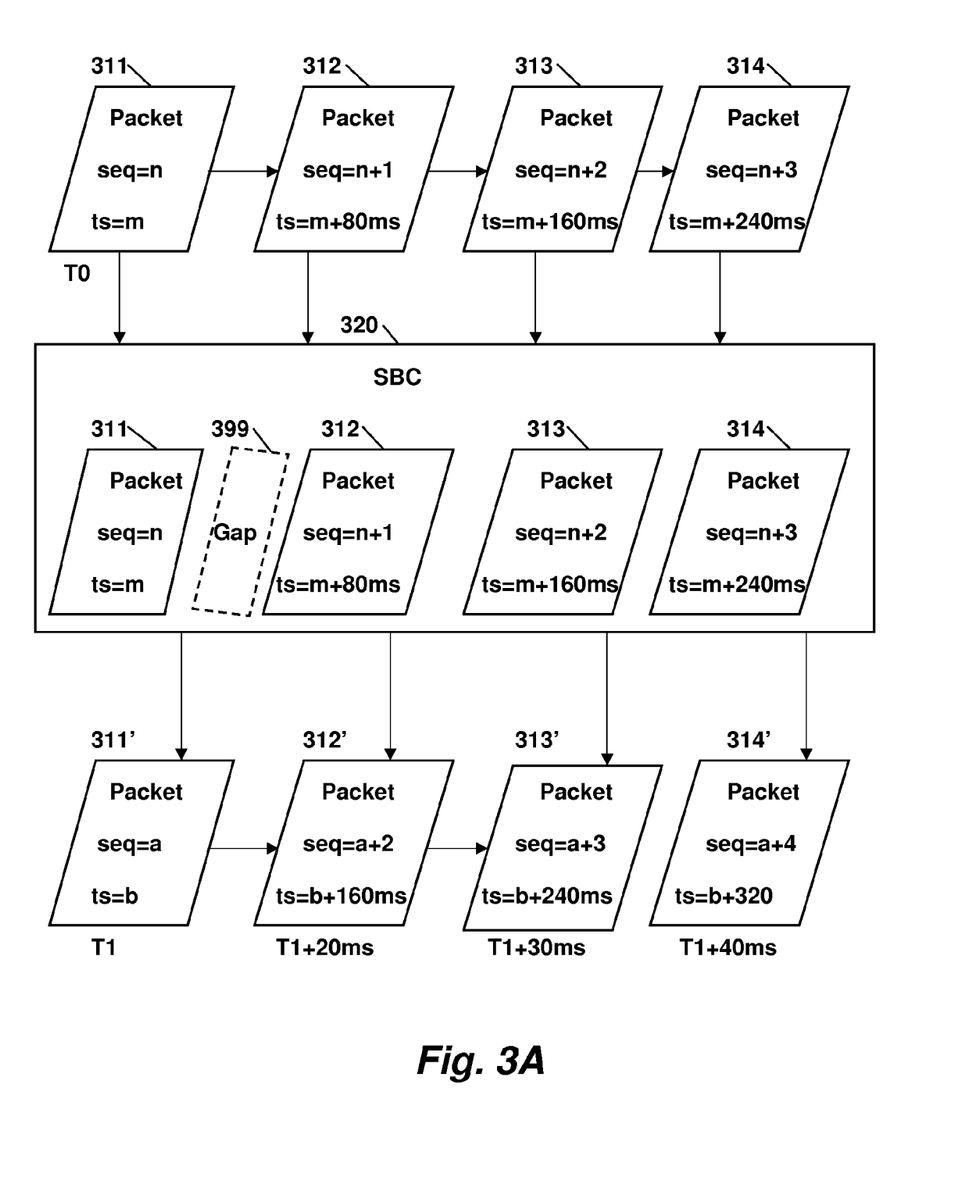
FIG. 3A is an illustration demonstrating the operation of an SBC which increases the jitter buffer delay, in accordance with the present invention.

Reference is made to FIG. 3A, which is an illustration demonstrating an SBC 320 which increases the jitter buffer delay associated with an incoming data stream by utilizing RTP header modification, in accordance with the present invention. SBC 320 of FIG. 3A may be generally similar to SBC 120 of FIG. 1.

A top portion of FIG. 3A shows an incoming data stream having four VoIP packets 311-314. An RTP header of packet 311 may have a sequence number of n, wherein n may be a positive number or zero; an RTP header of packet 312 may have a sequence number of n+1; an RTP header of packet 313 may have a sequence number of n+2; and an RTP header of packet 314 may have a sequence number of n+3. Furthermore, the RTP header of packet 311 may have a timestamp of m (e.g., measured in milliseconds); the RTP header of packet 312 may have a timestamp of m+80 milliseconds; the RTP header of packet 313 may have a timestamp of m+160 milliseconds; and the RTP header of packet 314 may have a timestamp of m+240 milliseconds.

A central portion of FIG. 3A shows the data stream as handled within SBC 320. A gap 399 is shown, but it does not exist within the data stream. Rather, SBC 320 modifies the RTP headers of VoIP packets 311-314, to generate an output data stream which is shown in the bottom portion of FIG. 3A, and which "leaves room" for a remote VoIP component to compensate for gap 399 (e.g., utilizing a suitable packet loss concealment method). Whereas the input data stream included four VoIP packets (311-314), the output data stream similarly includes four VoIP packets (denoted 311', 312', 313' and 314') having modified RTP headers. The sequence numbers of the four VoIP packets 311', 312', 313' and 314' having the modified RTP headers may be, for example, a, a+2, a+3, and a+4 (respectively), skipping and leaving a "gap" of one sequence number (a+1); and their timestamp values may be, for example, b, b+160, b+240 and b+320 (respectively), skipping and leaving a "gap" at timestamp b+80. It is noted that SBC 320 may output the modified data stream including the four VoIP packets 311', 312', 313' and 314' having the modified RTP headers at particular points in time, for example, at time points T1, T1+20 milliseconds, T1+30 milliseconds, and T1+40 milliseconds (respectively), skipping and leaving a "gap" at time point T1+10.

As demonstrated, the four incoming VoIP packets 311-314, which spanned 240 milliseconds and occupied four consecutive sequence numbers, were modified: particularly, their RTP headers have been modified such that the four VoIP packets 311'-314' that exit SBC 320 span 320 milliseconds (instead of 240 milliseconds) and span over a range of five consecutive sequence numbers (the range from "a" to "a+4", including the sequence numbers of a, a+2, a+3 and a+4, and skipping the sequence number of a+1). Accordingly, the jitter buffer delay is increased.

Figure 3B:
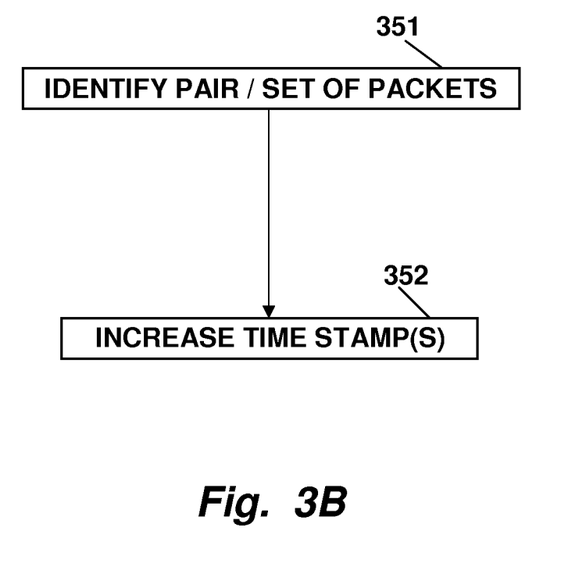
FIG. 3B is a schematic flowchart of a method of increasing jitter buffer delay, in accordance with the present invention.

Reference is made to FIG. 3B, which is a schematic flowchart of a method of increasing jitter buffer delay, in accordance with the present invention. The method may be implemented, for example, by system 100 of FIG. 1, by SBC 120 of FIG. 1, by SBC 320 of FIG. 3A, or by other suitable systems or devices.

The method may optionally include, for example, identifying a pair of two consecutive VoIP packets (or set or group of other number of VoIP packets) in the incoming data stream, e.g., which have consecutive sequence numbers (e.g., sequence numbers of 0 and 1, respectively) (block 351); and increasing the sequence number in the RTP header of (at least) the latter packet in that pair (or set) of packets (block 352), and optionally also in the RTP headers of subsequent VoIP packets in that data stream. Optionally, the sequence number of the latter packet may be increased by K units, wherein K is a natural number which may be computed as: the difference between the timestamp values of the two packets, divided by a standard or typical timestamp interval of a non-delayed data stream. The timestamp values in the RTP headers of those VoIP packets may be similarly modified (e.g., increased). The increase of the sequence numbers, and of the time stamps, may be calculated based on the desired or target increase in the jitter buffer delay. Other suitable operations may be used in accordance with the present invention.

The present invention may include correction, elimination or reduction of external network jitter of incoming RTP packets, which may be routed to local VoIP phones or local gateways. The present invention may be implemented, for example, in an SBC device, or between an SBC device and the elements of a local VoIP network (e.g., local IP phones and/or gateways). Adaptive jitter buffering may be performed without decoding and re-encoding of the VoIP media stream; and compressed data may be transferred "as is" to the suitable local VoIP component, optionally with a modified RTP header.

In accordance with the present invention, jitter buffer delay adjustment may be implemented without decoding and re-encoding of VoIP payload data or packets. Rather, the implementation may include deletion of RTP packet(s) and/or modification (or manipulation) of RTP packet header(s).

In accordance with the present invention, adjustment of jitter buffer delay may be performed by manipulating or modifying the RTP headers of substantially all VoIP packets of an incoming a data stream, or by manipulating or modifying the RTP headers of substantially all VoIP packets starting from a particular offset of an incoming a data stream.

In accordance with the present invention, substantially all the differences of timestamps and/or substantially all the differences of sequence numbers, of an incoming data stream, or of a portion of the data stream starting at a particular offset and onward, may be modified by manipulation or modification of RTP headers.

In accordance with the present invention, jitter buffer delay may be adjusted without decoding payload data of VoIP packet; or, without decoding and then re-encoding of payload data of VoIP packet. For example, payload data of VoIP packets may be decoded in order to identify silence period(s), such that RTP header modification for purposes of jitter buffer delay adjustment may be performed (exclusively, or more frequently) during such identified silence period(s); however, the present invention may not require or may not utilize substantially any re-encoding or transcoding of payload data (which may typically degrade voice quality and/or may typically require processing resources). Additionally or alternatively, silence period(s) may be identified or detected or recognized by utilizing other means or indicators which may not necessarily include decoding of payload data in the RTP stream, for example, by analyzing additional or other information in the RTP packets and/or in the RTP stream and/or in RTP headers. For example, an RTP header may optionally include a flag or indication that the RTP packet is a silence period, and this indication in the RTP header may be used for silence period identification for purposes of jitter buffer delay adjustment. Additionally or alternatively, for example, a vocoder or voice encoder may include a signal level or a parameter that is correlated with signal level (where signal level can be estimated based on it) in the compressed or encoded voice packets; and such signal level indication or parameter may be used by the present invention in order to identify silence period(s).

The methods and operations of the present invention may be used in conjunction with various devices, systems, components, communication standards and/or communication protocols, for example, silence compression, speech coder compression algorithm(s), media protection, Secure RTP (SRTP), packet redundancy schemes, or the like.

In accordance with the present invention, an SBC may be able to handle an incoming RTP stream which arrives with re-order or out-of-order, and/or an incoming RTP stream which arrives with packet loss or suffering from lost packets. The SBC may take into account such deficiencies or characteristics of the incoming RTP stream, and may generate the output RTP stream with the modified RTP header(s) accordingly.

The present invention may optionally be used in conjunction with RTP trans-rating, or modification of RTP framing, or modification of the size of RTP frames, or modification of the difference (e.g., in milliseconds) between two consecutive RTP frames. For example, in accordance with the present invention, an SBC may receive an RTP input stream having a frame duration of 10 milliseconds; and the SBC may output an RTP stream having a frame duration of 60 milliseconds, together with implementing the suitable RTP header manipulation at the resolution of the output RTP stream.

The present invention may be utilized in conjunction with a non-standard communication protocol, for example, a proprietary variant or version which of a real-time transport protocol which may be similar to (but not identical) to the standard RTP, e.g., utilizing proprietary or non-proprietary headers which may optionally include, timestamp and/or sequence number and/or equivalent or other parameters. Accordingly, the "RTP header modification" described herein, may thus include modification of such non-RTP header, or modification of a header of such variant protocol, proprietary protocol, or any other suitable protocol which may carry voice and/or video and/or other media type, or the like.

Although portions of the discussion herein may relate, for demonstrative purposes to VoIP packets and/or to voice streams or packets, the present invention may be utilized in conjunction with types of packets and/or streams, for example, non-voice audio streams or packets, video streams or packets, multimedia streams or packets, or the like.

In accordance with the present invention, the SBC may be able to receive a first data stream and then a second, subsequent, data stream. For the first data stream, the RTP header modifier may decrease the jitter buffer delay; and for the second data stream, the RTP header modifier may increase the jitter buffer delay; or vice versa.

In accordance with the present invention, the SBC may be able to receive a data stream having a first portion and then a second (consecutive or non-consecutive) portion. For the first portion of the data stream, the RTP header modifier may decrease the jitter buffer delay; and for the second portion of the data stream, the RTP header modifier may increase the jitter buffer delay; or vice versa.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" or "a plurality" as used herein include, for example, "multiple" or "two or more". For example, "a plurality of items" includes two or more items.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine (e.g., a computer or an electronic device) to perform a method and/or operations described herein.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the present invention have been illustrated and described herein, many modifications, substitutions, changes, and equivalents may occur to those skilled in the art. Accordingly, the claims are intended to cover all such modifications, substitutions, changes, and equivalents.

What is claimed is:
1. A method of Voice over Internet Protocol (VoIP) communication, the method comprising:
receiving a data stream comprising a set of VoIP packets; and
modifying a Real Time Protocol (RTP) header of at least one of said VoIP packets to modify a jitter buffer delay of said data stream, wherein the method comprises increasing the jitter buffer delay of said data stream by performing:
- (a) identifying a pair of consecutive packets in the incoming data stream, the pair of consecutive packets having consecutive sequence numbers;
- (b) increasing a sequence number in an RTP header of at least a latter packet in said pair of consecutive packets, wherein the increasing comprises: non-sequentially increasing the sequence number in the RTP header by a natural number computed based on a target increase in jitter buffer delay of a remote VoIP component to which a modified data stream is to be transmitted;
- (c) transmitting to the remote VoIP component the modified data stream which comprises one or more packet gaps, to cause the remote VoIP receiver to recognize a packet loss and to remotely generate one or more additional VoIP packets using packet loss concealment.

2. The method of claim 1, comprising decreasing the jitter buffer delay by:
dropping at least one packet from said data stream; and
decreasing a sequence number and a timestamp value in an RTP header of at least one additional packet subsequent to said at least one packet.

3. The method of claim 2, comprising:
decreasing a sequence number and a timestamp value in RTP headers of all packets subsequent to said at least one packet.

4. The method of claim 1, comprising:
increasing a sequence number in RTP headers of all packets in said data stream starting at said latter packet and onward.

5. The method of claim 1, comprising:
modifying the RTP header without decoding a payload of any VoIP packet of said data stream.

6. The method of claim 1, comprising:
modifying the RTP header without re-encoding a payload of any VoIP packet of said data stream.

7. The method of claim 1, comprising:
detecting a portion of the data stream which corresponds to a silence period; and
modifying the RTP headers of one or more VoIP packets of that portion of the data stream more frequently relative to other one or more portions of said data stream.

8. An apparatus of Voice over Internet Protocol (VoIP) communication, the apparatus comprising:
a jitter buffer to receive a data stream comprising a set of VoIP packets; and
a Real Time Protocol (RTP) header modifier to modify an RTP header of at least one of said VoIP packets to modify a jitter buffer delay of said data stream,
wherein the RTP header modifier is to increase the jitter buffer delay by performing:
- (a) identifying a pair of consecutive packets in the incoming data stream, the pair of consecutive packets having consecutive sequence numbers;
- (b) increasing a sequence number in an RTP header of at least a latter packet in said pair of consecutive packets, wherein the increasing comprises: non-sequentially increasing the sequence number in the RTP header by a natural number computed based on a target increase in jitter buffer delay of a remote VoIP component to which a modified data stream is to be transmitted;
- (c) transmitting to the remote VoIP component the modified data stream which comprises one or more packet gaps, to cause the remote VoIP receiver to recognize a packet loss and to remotely one or more additional VoIP packets using packet loss concealment.

9. The apparatus of claim 8, wherein the RTP header modifier is to decrease the jitter buffer delay; wherein the apparatus comprises a jitter buffer correction logic to drop at least one packet from said data stream; wherein the RTP header modifier is to decrease a sequence number and a timestamp value in an RTP header of at least one additional packet subsequent to said at least one packet.

10. The apparatus of claim 9, wherein the RTP header modifier is to decrease a sequence number and a timestamp value in RTP headers of all packets subsequent to said at least one packet.

11. The apparatus of claim 8, wherein the RTP header modifier is to increase a sequence number in RTP headers of all packets in said data stream starting at said latter packet and onward.

12. The apparatus of claim 8, wherein the RTP header modifier is to modify the RTP header without decoding a payload of any VoIP packet of said data stream.

13. The apparatus of claim 8, wherein the RTP header modifier is to modify the RTP header without re-encoding a payload of any VoIP packet of said data stream.

14. The apparatus of claim 8, comprising a jitter buffer correction logic to detect a portion of the data stream which corresponds to a silence period; and wherein the RTP header modifier is to modify the RTP headers of one or more VoIP packets of that portion of the data stream more frequently relative to other one or more portions of said data stream.

15. The apparatus of claim 8, wherein the jitter buffer is to receive a first data stream portion and a second, subsequent, data stream portion; wherein for the first data stream portion, the RTP header modifier is to decrease the jitter buffer delay; and wherein for the second data stream portion, the RTP header modifier is to increase the jitter buffer delay.

16. The apparatus of claim 8, wherein the apparatus comprises a session border controller.

* * * * *